(12) United States Patent
Mao et al.

(10) Patent No.: US 11,906,309 B2
(45) Date of Patent: Feb. 20, 2024

(54) METHOD AND APPARATUS FOR PROVIDING A MAP MATCHER TOLERANT TO WRONG MAP FEATURES

(71) Applicant: HERE GLOBAL B.V., Eindhoven (NL)

(72) Inventors: Qi Mao, Arlington, TX (US); Qin Chen, Chicago, IL (US); Liming Wang, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 651 days.

(21) Appl. No.: 17/031,494

(22) Filed: Sep. 24, 2020

(65) Prior Publication Data

US 2021/0095971 A1 Apr. 1, 2021

Related U.S. Application Data

(60) Provisional application No. 62/907,294, filed on Sep. 27, 2019.

(51) Int. Cl.
*G01C 21/30* (2006.01)
*G06F 16/29* (2019.01)
(Continued)

(52) U.S. Cl.
CPC ............. *G01C 21/30* (2013.01); *G01C 21/32* (2013.01); *G01C 21/3461* (2013.01); *G06F 16/29* (2019.01); *G06F 18/24* (2023.01)

(58) Field of Classification Search
CPC .... G01C 21/30; G01C 21/32; G01C 21/3461; G06F 16/29; G06F 18/24
See application file for complete search history.

(56) References Cited

U.S. PATENT DOCUMENTS

2006/0212216 A1 9/2006 Kobayashi et al.
2009/0138497 A1* 5/2009 Zavoli ................ G01C 21/3819
707/999.102

(Continued)

FOREIGN PATENT DOCUMENTS

EP 2574880 A2 4/2013

OTHER PUBLICATIONS

Office Action for related European Patent Application No. 20198459.8-1001, dated May 26, 2021, 17 pages.
(Continued)

*Primary Examiner* — Rami Khatib
*Assistant Examiner* — Gabriel Joseph Rene Lambert
(74) *Attorney, Agent, or Firm* — HERE GLOBAL B.V.; Jeffrey R. Moisan

(57) ABSTRACT

An approach is provided for providing a map matcher tolerant to wrong map features. The approach involves, for instance, finding a segment of a probe trajectory containing a plurality of low-speed probe points. The approach also involves forming a line between a first and a last probe point of the segment. The approach further involves calculating a distance from each probe point of the segment to the line. The approach further involves splitting the segment based on comparing the distance to a threshold at a turning point of the segment. The approach further involves creating a new probe trajectory based on a plurality of high-speed probe points in the probe trajectory and the turning point. The approach further involves estimating a heading of the turning point of the segment based on the new trajectory, and then performing a feasibility check between two consecutive probe points of the new trajectory.

14 Claims, 15 Drawing Sheets

(51) Int. Cl.
*G01C 21/32* (2006.01)
*G01C 21/34* (2006.01)
*G06F 18/24* (2023.01)

(56) References Cited

U.S. PATENT DOCUMENTS

| | | | |
|---|---|---|---|
| 2014/0244164 A1* | 8/2014 | Gale | G01C 21/30 |
| | | | 701/446 |
| 2016/0275786 A1* | 9/2016 | Fowe | G08G 1/0141 |
| 2016/0335923 A1* | 11/2016 | Hofmann | G01C 21/3819 |
| 2017/0314934 A1* | 11/2017 | Averbuch | G01S 19/50 |
| 2018/0066957 A1* | 3/2018 | Stroila | G01C 21/3841 |
| 2018/0121483 A1* | 5/2018 | Giurgiu | G06F 16/23 |
| 2018/0174447 A1* | 6/2018 | Pellolio | G08G 1/052 |
| 2018/0224293 A1* | 8/2018 | Xu | G01C 21/30 |
| 2019/0033082 A1* | 1/2019 | Asai | G05D 1/0274 |
| 2020/0309535 A1* | 10/2020 | Shi | G01C 21/3407 |

OTHER PUBLICATIONS

Wikipedia, "Map Matching", retrieved from https://en.wikipedia.org/w/index.php?title=Map_matching&oldid=902658723, Jun. 20, 2019, 2 pages.

* cited by examiner

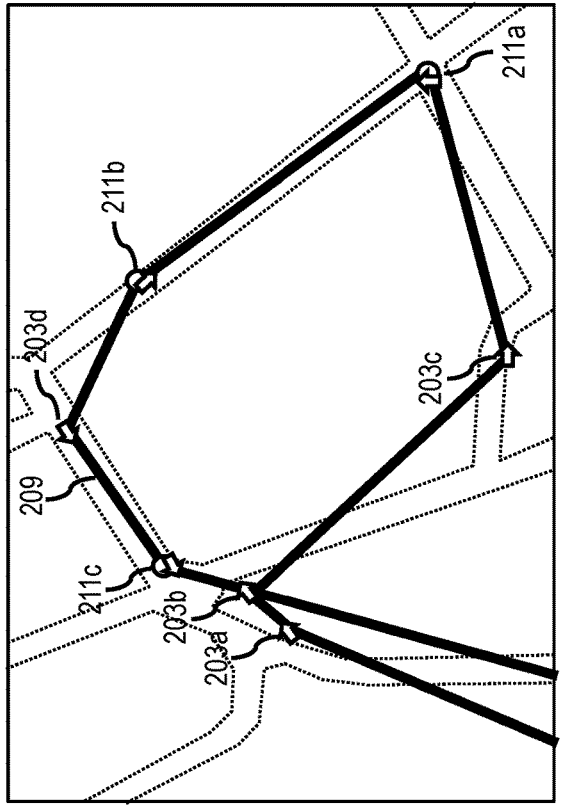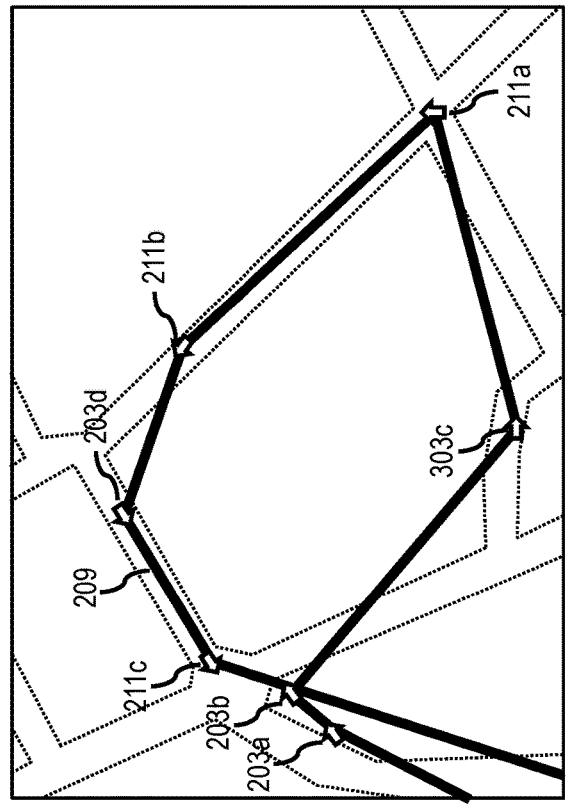
FIG. 2B
FIG. 2C

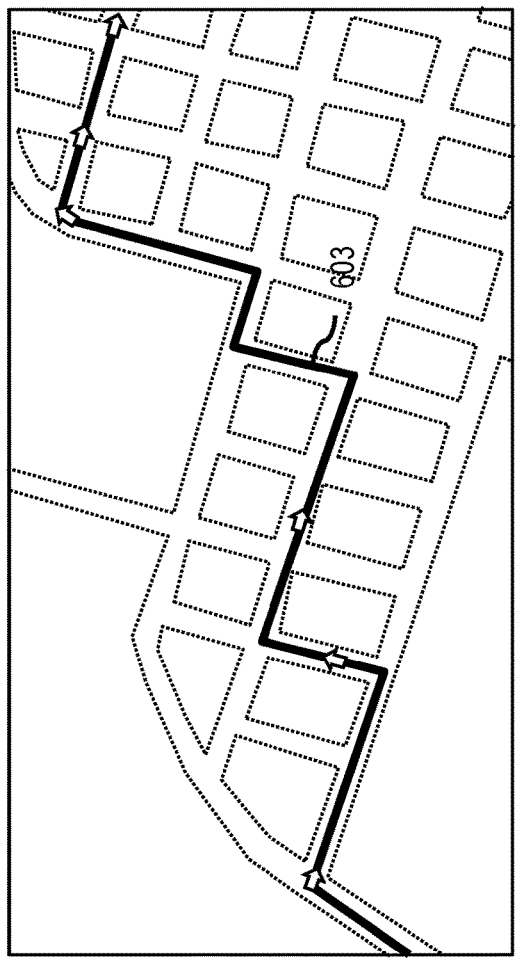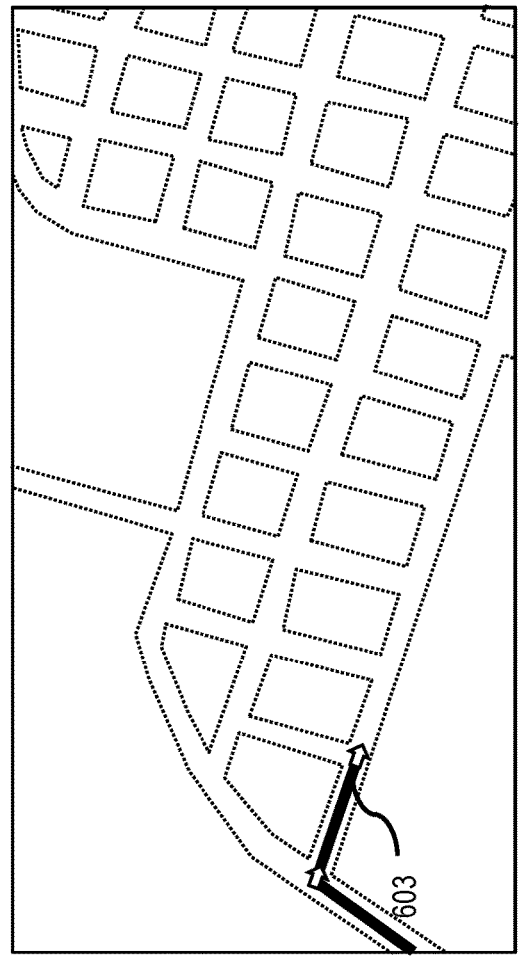
FIG. 6C
FIG. 6D

METHOD AND APPARATUS FOR PROVIDING A MAP MATCHER TOLERANT TO WRONG MAP FEATURES

CROSS REFERENCE TO RELATED APPLICATION

This application claims priority to U.S. Provisional Application Ser. No. 62/907,294, filed Sep. 27, 2019, entitled "PROVIDING A MAP-MATCHER USING WRONG MAP FEATURES," the entirety of which is incorporated herein by reference.

BACKGROUND

Because of continuous changes to the geometry and configuration of road and other transportation networks, mapping-related service providers (e.g., map data providers, navigation service providers, etc.) face significant technical challenges to creating and maintaining up-to-date map data. One area of development has been related to generating, updating, and/or analyzing map data through use of raw location data such as probe points collected by devices and/or vehicles equipped with sensors to report location, heading, speed, time, etc. as they travel. As part of this process, map-matchers (e.g., point-based map-matchers) are used to process the probe points to identify the correct road or path on which a probe device or vehicle is traveling, and to determine the device's location on that road or path. However, current map-matchers can often encounter issues of accuracy, scalability, and/or efficiency, particularly when processing high volumes of probe data collected from less reliable sources (e.g., crowdsourcing probe data) due to the noise or error in the probe data and/or the inaccurate or wrong features of out-of-date map data.

SOME EXAMPLE EMBODIMENTS

Therefore, there is a need for a robust and accurate path-based map matching system that uses or is otherwise tolerant to wrong map features (e.g., wrong from out-of-date map data) and increased noise. In one embodiment, such a system can be a part of a mapping platform that leverages crowdsourcing probe data as a fresh resource to automatically update the features of a digital map and make the map fresh or up-to-date. These up-to-date map features can be very important for navigation systems and autonomous driving such as restricted driving maneuvers (RDM) and direction of travel (DoT).

According to one embodiment, a method comprises finding one or more segments of a probe trajectory containing a plurality of low-speed probe points. The method also comprises forming a line between a first probe point and a last probe point for each segment of the one or more segments. The method further comprises calculating a distance from each probe point of each segment to the line. The method further comprises splitting each segment based on comparing the distance to a threshold at a turning point of each segment. The method further comprises creating a new probe trajectory based on a plurality of high-speed probe points in the probe trajectory and the turning point of each segment. The method further comprises estimating a heading of the turning point of each segment based on the new trajectory. The method further comprises performing a feasibility check between two consecutive probe points of the new trajectory. A map matching of the new trajectory is based on the feasibility check. In one embodiment, the method further comprises detecting a wrong map feature in a geographic database used for the map matching based on the feasibility check.

According to another embodiment, an apparatus comprises at least one processor, and at least one memory including computer program code for one or more computer programs, the at least one memory and the computer program code configured to, with the at least one processor, cause, at least in part, the apparatus to find a one or more segments of a probe trajectory containing a plurality of low-speed probe points. The apparatus is also caused to form a line between a first probe point and a last probe point for each segment of the one or more segments. The apparatus is further caused to calculate a distance from each probe point of the said each segment to the line. The apparatus is further caused to split said each segment based on comparing the distance to a threshold at a turning point of the said each segment. The apparatus is further caused to create a new probe trajectory based on a plurality of high-speed probe points in the probe trajectory and the turning point of said each segment. The apparatus is further caused to estimate a heading of the turning point of said each segment based on the new trajectory. The apparatus is further caused to perform a feasibility check between two consecutive probe points of the new trajectory. A map matching of the new trajectory is based on the feasibility check. In one embodiment, the apparatus is further caused to detect a wrong map feature in a geographic databased used for the map matching based on the feasibility check.

According to another embodiment, a computer-readable storage medium carries one or more sequences of one or more instructions which, when executed by one or more processors, cause, at least in part, an apparatus to find a one or more segments of a probe trajectory containing a plurality of low-speed probe points. The apparatus is also caused to form a line between a first probe point and a last probe point for each segment of the one or more segments. The apparatus is further caused to calculate a distance from each probe point of the said each segment to the line. The apparatus is further caused to split said each segment based on comparing the distance to a threshold at a turning point of the said each segment. The apparatus is further caused to create a new probe trajectory based on a plurality of high-speed probe points in the probe trajectory and the turning point of said each segment. The apparatus is further caused to estimate a heading of the turning point of said each segment based on the new trajectory. The apparatus is further caused to perform a feasibility check between two consecutive probe points of the new trajectory. A map matching of the new trajectory is based on the feasibility check. In one embodiment, the apparatus is further caused to detect a wrong map feature in a geographic databased used for the map matching based on the feasibility check.

According to another embodiment, an apparatus comprises means for finding one or more segments of a probe trajectory containing a plurality of low-speed probe points. The apparatus also comprises means for forming a line between a first probe point and a last probe point for each segment of the one or more segments. The apparatus further comprises means for calculating a distance from each probe point of each segment to the line. The apparatus further comprises means for splitting each segment based on comparing the distance to a threshold at a turning point of the said each segment. The apparatus further comprises means for creating a new probe trajectory based on a plurality of high-speed probe points in the probe trajectory and the turning point of each segment. The apparatus further comprises means for estimating a heading of the turning point of each segment based on the new trajectory. The apparatus further comprises means for performing a feasibility check between two consecutive probe points of the new trajectory. A map matching of the new trajectory is based on the feasibility check. In one embodiment, the apparatus further comprises means for detecting a wrong map feature in a geographic database used for the map matching based on the feasibility check.

According to one embodiment, a method comprises computing one or more candidate probe points for a given probe point at a selected position in a probe trajectory. The method also comprises splitting the one or more candidate probe points into a directed set and an undirected set. The directed set is based on a directed road network and the undirected set is based on an undirected road network. The method further comprises finding one or more transitions between the one or more candidate probe points of the direct set, the undirected set, or a combination thereof. The method further comprises truncating the probe trajectory based on the one or more transitions.

According to another embodiment, an apparatus comprises at least one processor, and at least one memory including computer program code for one or more computer programs, the at least one memory and the computer program code configured to, with the at least one processor, cause, at least in part, the apparatus to compute one or more candidate probe points for a given probe point at a selected position in a probe trajectory. The apparatus is also caused to split the one or more candidate probe points into a directed set and an undirected set. The directed set is based on a directed road network and the undirected set is based on an undirected road network. The apparatus is also caused to find one or more transitions between the one or more candidate probe points of the direct set, the undirected set, or a combination thereof. The apparatus is also caused to truncate the probe trajectory based on the one or more transitions.

According to another embodiment, a computer-readable storage medium carries one or more sequences of one or more instructions which, when executed by one or more processors, cause, at least in part, an apparatus to compute one or more candidate probe points for a given probe point at a selected position in a probe trajectory. The apparatus is also caused to split the one or more candidate probe points into a directed set and an undirected set. The directed set is based on a directed road network and the undirected set is based on an undirected road network. The apparatus is also caused to find one or more transitions between the one or more candidate probe points of the direct set, the undirected set, or a combination thereof. The apparatus is also caused to truncate the probe trajectory based on the one or more transitions.

According to another embodiment, an apparatus comprises means for computing one or more candidate probe points for a given probe point at a selected position in a probe trajectory. The apparatus also comprises means for splitting the one or more candidate probe points into a directed set and an undirected set. The directed set is based on a directed road network and the undirected set is based on an undirected road network. The apparatus further comprises means for finding one or more transitions between the one or more candidate probe points of the direct set, the undirected set, or a combination thereof. The apparatus further comprises means for truncating the probe trajectory based on the one or more transitions.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 2A, 2B, and 2C are diagrams illustrating a process for applying turning point detection to a probe trajectory, according to one embodiment;

FIGS. 6A-6D are diagrams illustrating an example of an invalid transition check because of missing geometry in a given road network, according to one embodiment;

DESCRIPTION OF SOME EMBODIMENTS

Examples of a method, apparatus, and computer program for providing a map matcher tolerant to wrong map features are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
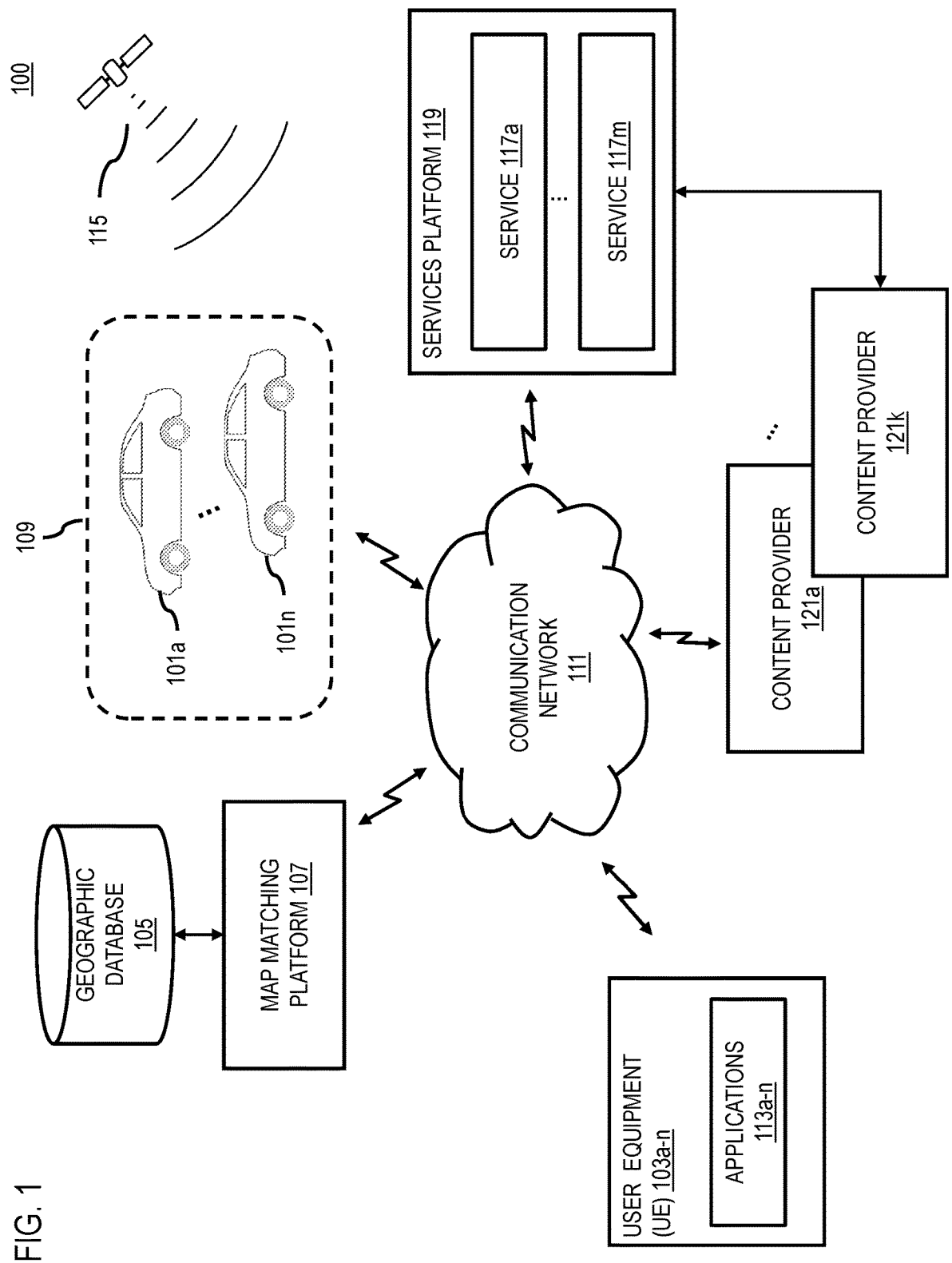
FIG. 1 is a diagram of a system capable of providing a map matcher tolerant to wrong map features, according to one embodiment.

FIG. 1 is a diagram of a system capable of providing a map matcher tolerant to wrong map features, according to one embodiment. Probe data (e.g., Global Positioning System (GPS) data or location point data collected using any other equivalent positioning technology) is used as a widely available and fresh resource (e.g., up-to-date resource) in the map making industry to identify map attributes such as new geometry and change of link direction of travel (DoT), speed limit, and/or the like. As part of the raw probe data or GPS processing, map matchers are used to identify the correct road on which the probe or GPS device (e.g., probe vehicles 101a-101n, probe user equipment (UE) devices 103a-103n, etc.) is travelling and to determine the device location on that road segment. Significant progress has been made in the area of map matching technologies and algorithms over the past decade, and these map matching technologies are widely used for many large-scale location-based applications and traffic management services, such as vehicle navigation, traffic and incident reporting, etc.

Generally, there are two types of map matchers: (1) point-based map matchers, and (2) trajectory-based map matchers. For example, a point-based map matcher (also known as a real-time map matcher) takes an individual GPS or probe point to match to the road segment or link based on, for instance, a maximum likelihood. On the other hand, a trajectory-based map matcher (also known as post-process map matcher) can produce more accurate results by taking more information in the form of a sequence of GPS or probe points (e.g., instead of a single probe point) and using more complicated approaches to map match the trajectory to a road segment.

Despite these developments, map matching still presents significant technical problems and challenges for the map making industry such as but not limited to:

(1) Most traditional map matchers assume that the map information or data (e.g., map data stored in the geographic database 105) against which the probe data is map matched is correct; and this assumption may not be valid in the context of detecting map changes because the geographic database 105 may not reflect changes in the road network that have been made since the last map update;

(2) Probe trajectories (e.g., a time-sequence set of probe data points associated with a given probe device) with large location error are difficult to map match accurately;

(3) There is a need to have a way to identify where the feasible path cannot be found from the probe data (e.g., when the mapped directions of travel are not correct for the road segment of interest, or when probe or GPS trajectories go off road).

To address these technical challenges, the system 100 of FIG. 1 introduces a map matching platform 107 that includes a map matcher implementation consisting of the one or more embodiments of the various features discussed below.

In one embodiment, the map matching platform 107 includes a novel turning point detection algorithm or process for handling low-speed probes (e.g., probes traveling below a speed threshold). For example, probes with low speed can cause the computation of inaccurate probe headings and create a "cloud" of probe points in close proximity to each other. These low-speed issues can mislead traditional map matchers and result in inaccurate map matching results.

In another embodiment, the map matching platform 107 includes a novel Viterbi algorithm or process that leverages a mixture of directed and undirected road network or probes for solving the wrong directions of travel in the map data. By way of example, the various embodiments described herein not only can detect wrong or incorrect DoTs in the current map data, but also can achieve correct map matching results based on the road network regardless of these wrong DoTs or other similar wrong/incorrect map features.

In yet another embodiment, the map matching platform 107 includes a set of checks for the feasibility of the computed map matching results. More specifically, the map matching platform 107 provides a principle way to integrate all these checks for handling wrong map features such as missing geometry, out-of-date driving maneuvers, wrong direction of travels, as well as complex road structures like parallel roads and the discrepancy between physical roads and the central lines of standard definition (SD) map data.

In one embodiment, various types of feasibility matching processes can be categorized such as off-road probes and invalid-transition probes. Different categories can be used for various tasks, such as the missing geometry trigger to quickly find the possible regions, and parking accessors, where two parts of segments in one trajectory are categorized as different types such as map-matched probes and off-road probes.

The various embodiments described herein provide for several advantages when compared to traditional approaches. These advantages include but are not limited to:

The embodiments of the map matching platform 107 provide flexibility to run against different types of maps including but not limited to standard definition (SD) map data, high definition (HD) map data, map data for autonomous or highly-assisted-driving (HAD) vehicles, etc.

The embodiments of the map matching platform 107 provide robust decoding used for accurate matching results.

The embodiments of the map matching platform 107 provide for matching slow probe points (e.g., with possibly wrong headings) to the road network accurately.

The embodiments of the map matching platform 107 provide for matching probes to the road network with wrong DoTs and can return the routes with the corrected DoTs.

a set of feasibility checks are applied to help diagnose the consistency between probe trajectories. Users can choose to stop matching and obtain a set of infeasibility categories for other use cases or continue the matching by bypassing these infeasible segments.

In one embodiment, the output of the map matching platform 107 (e.g., detected wrong map features and map matching results generated according to the various embodiments described herein) can be used for any number of applications relying on map matching that is tolerant to wrong map features, noisy probe data, and/or the like. These use cases include but are not limited to: (1) map making; (2) providing better navigation experiences (e.g., especially for cheaper user devices which may have lower quality GPS or other positioning systems); (3) providing location intelligence; (4) finding parking accessors (e.g., segments leading to or from parking locations on or off street); (5) improving autonomous driving or highly assisted driving; and (6) providing an improved last mile solution for a trip where map data is likely to be more incomplete or out-of-date. These use cases are discussed in more detail further below.

In one embodiment, the map matching platform 107 can work alone or in combination with other components of the system 100 to provide a map matcher tolerant to wrong features in the map data. However, in some embodiments, it is contemplated that the functions of the map matching platform 107 may be combined or performed by other components of equivalent functionality. The above presented modules and components of the map matching platform 107 can be implemented in hardware, firmware, software, or a combination thereof. In another embodiment, the map matching platform 107 and/or its components may be implemented as a cloud-based service, local service, native application, or combination thereof. The functions of the map matching platform 107 are discussed below.

In one embodiment, the functions of the map matching platform 107 are discussed with respect to a geographic database 105 (e.g., a map database) with the following features:

A link is a line string object that represents the centerline of the road geometry. It is defined by a sequential series of geo-coordinates (e.g., latitude/longitude) that specify the shape of the link. A line that connects these points is called a link segment. In one embodiment, the most southwest point is defined as the Reference Node, and other nodes of the link are defined as Nonreference Nodes.

Links in the geographic database 105 also have directionalities. The system 100 uses T to denote a one-way link that is going to reference node, and F to denote a one-way link that is coming from a reference node. B is used to represent bi-directional links.

It is noted that the map features described above are provided by way of illustration and not as limitations. It is contemplated that any equivalent map features can be used in the embodiments described herein.

In one embodiment, the map matching platform 107 includes a map matcher that can accurately match noisy probe points (e.g., probe points with error above a threshold value) to a given road network with possibly wrong map features (e.g., the geographic database 105 against which the probe points/data are matched are incorrect or out-of-date). By way of example, the wrong map features that can be considered include but are not limited to:

Direction of travel (DoT)
Restrictive driving maneuver (RDM)
Road geometry

And, noisy probe points under certain embodiments are targeted based on the categories such as but not limited to:

Low speed
Located around complex intersection
In-between parallel roads
Off-road and invalid-transition In one embodiment, all the above features are incorporated into a Viterbi-based map matching algorithm (or equivalent) with some non-trivial modifications as described herein. Below, each of the above features are discussed in detail.

In one embodiment, the map matching platform 107 incorporates turning point detection over continuous low-speed probe points to generate a processed probe trajectory for map matching. For example, low-speed probe points (probe points with a travel speed below a threshold value) can potentially cause location shift (e.g., GPS location shift) and inaccurate heading information (e.g., due to positioning error). Moreover, low-speed probe points are usually grouped together to form a cluster in certain regions such as POIs and on-street parking. This cluster can prevent a map matcher from taking advantage of using heading as a prior, and can also mislead a map matching algorithm into detecting a one-directional road as a bi-directional road due, for instance, to a zig-zag trace formed by the probe points inside the cluster. To prevent these drawbacks, a traditional naive approach is to drop all the low-speed points in a preprocessing step, but this dropping then introduces a big jump between two probe points when a large number of low-speed probes are dropped. However, due to the big jump, the map matching algorithm (e.g., a Viterbi algorithm) becomes inaccurate since there can be many possible routes between the two points.

Figure 2A:
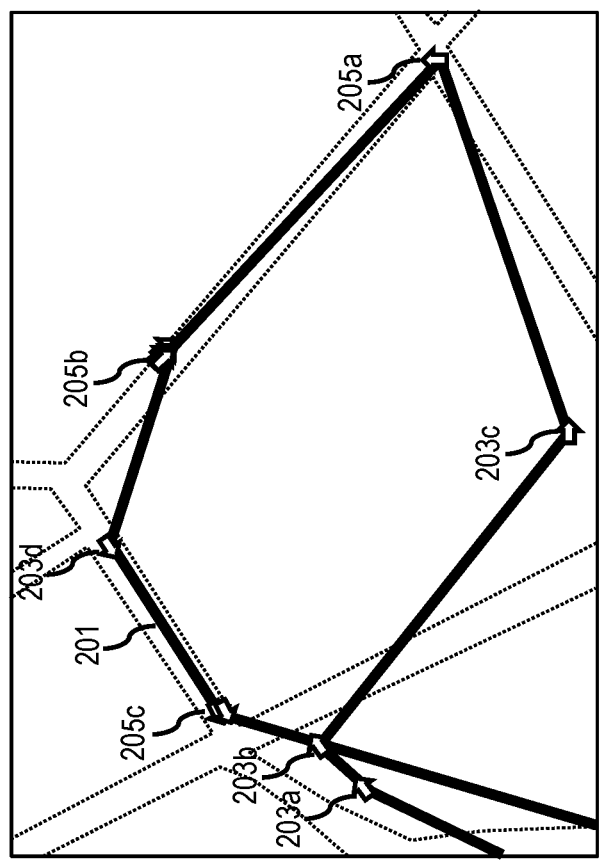
Figure 3:
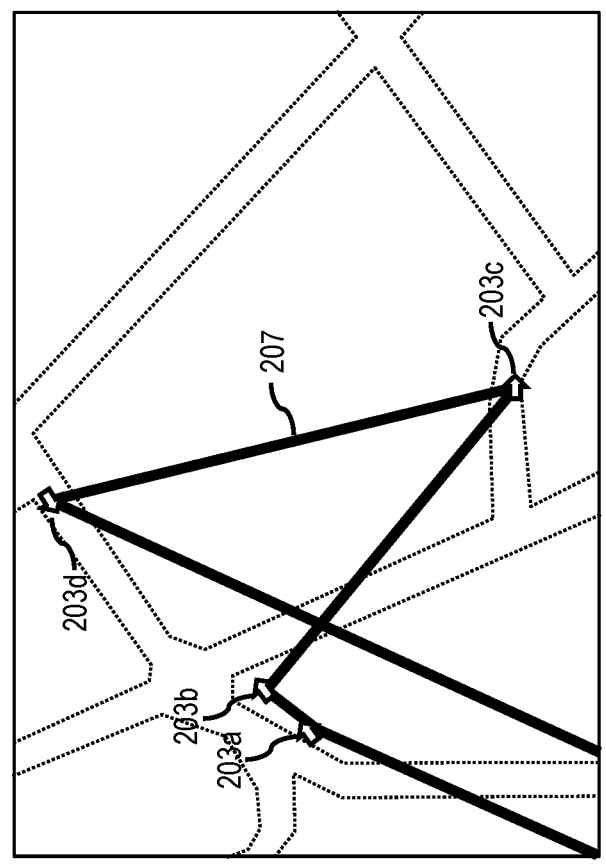
FIG. 3 is a diagram illustrating a process for naively dropping low-speed probe points, according to one embodiment.

FIGS. 2A and 3 illustrate the issues of low-speed probe points and the preprocessed trajectory after dropping the low-speed probe points, according to one embodiment. More specifically, FIG. 2A illustrates a probe trajectory 201 that includes high-speed probe points 203*a*-203*d* (e.g., probes with a speed of 10 km/h or higher indicated by white arrows in the respective heading direction) and low speed probe points 205*a*-205*c* (e.g., probes with a speed below 10 km/h indicated by black arrows in the respective heading direction). In this example, some of the low speed probe points 205a-205c include multiple points that are very close together in clusters. FIG. 3 illustrates the traditional naive approach that drops all low speed clusters leaving the processed trajectory 207 that is missing substantial detail when compared to the original probe trajectory 201 of FIG. 2A, thereby leading to potentially inaccurate map matching results.

To solve the above issues, in one embodiment, the map matching platform 107 detects some key points, called turning points, for each segment of one trajectory where all points are low-speed points. The motivation for detecting turning points is that:

(i) If a probe trace or trajectory is straight on the road, a map matching algorithm (e.g., Viterbi-based map matcher) using shortest path as the transition from one point to the other can be accurate;

(ii) A cluster of low-speed points that are usually very close can be treated as one point; and (iii) Low-speed points are usually seen in an intersection, and map matching can be more ambiguous around the intersection, so probe points around the intersection is important. Based on these observations, the map matching platform 107 can include the turning point detection process illustrated in the embodiments of FIG. 4 below to determine a new trajectory constructed using turning points (as depicted in FIG. 2B) and to re-estimate the heading for each turning point (as depicted in FIG. 2C).

Figure 4:
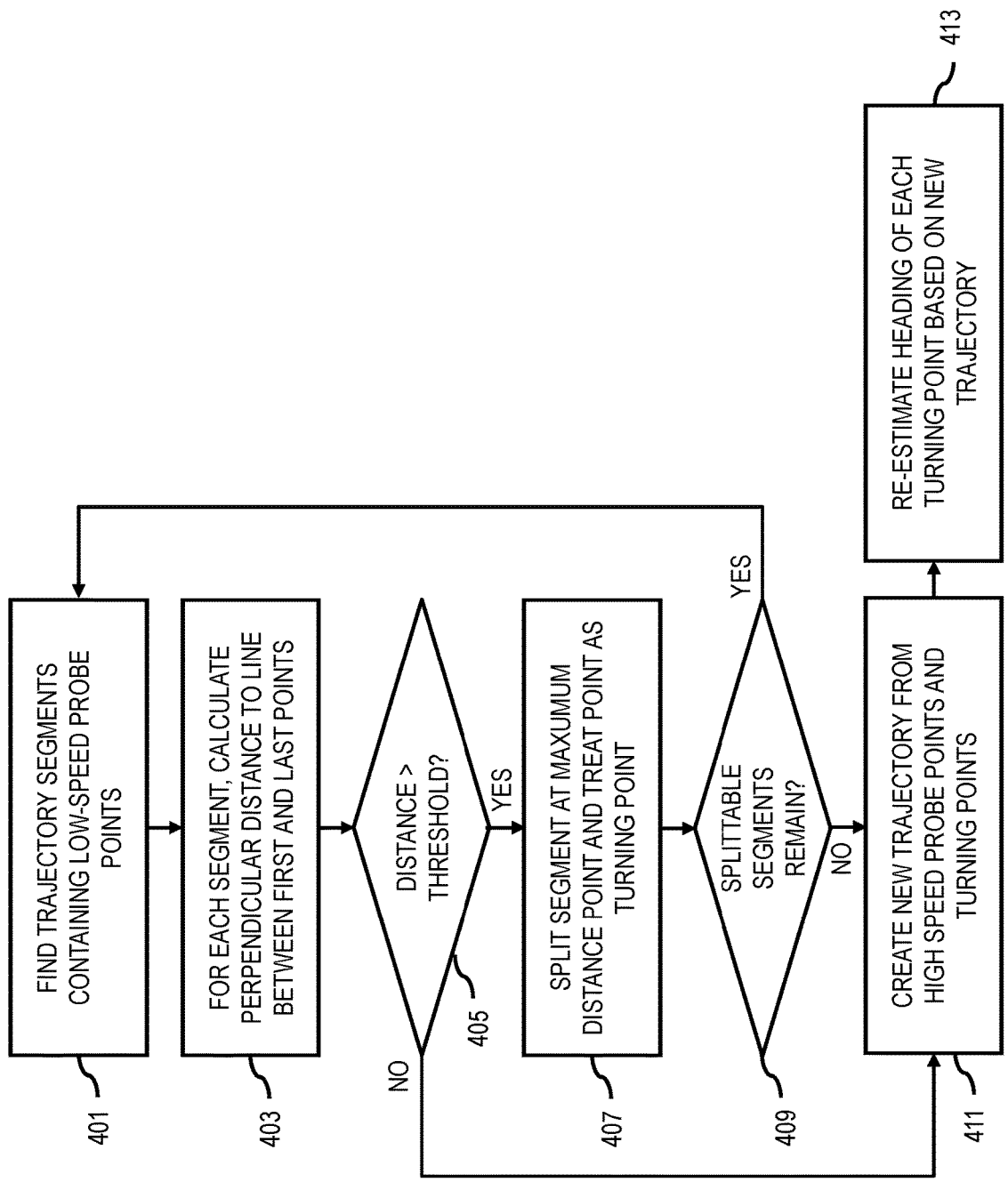
FIG. 4 is a flowchart of a process for applying turning point detection to a probe trajectory, according to one embodiment.
Figure 12:
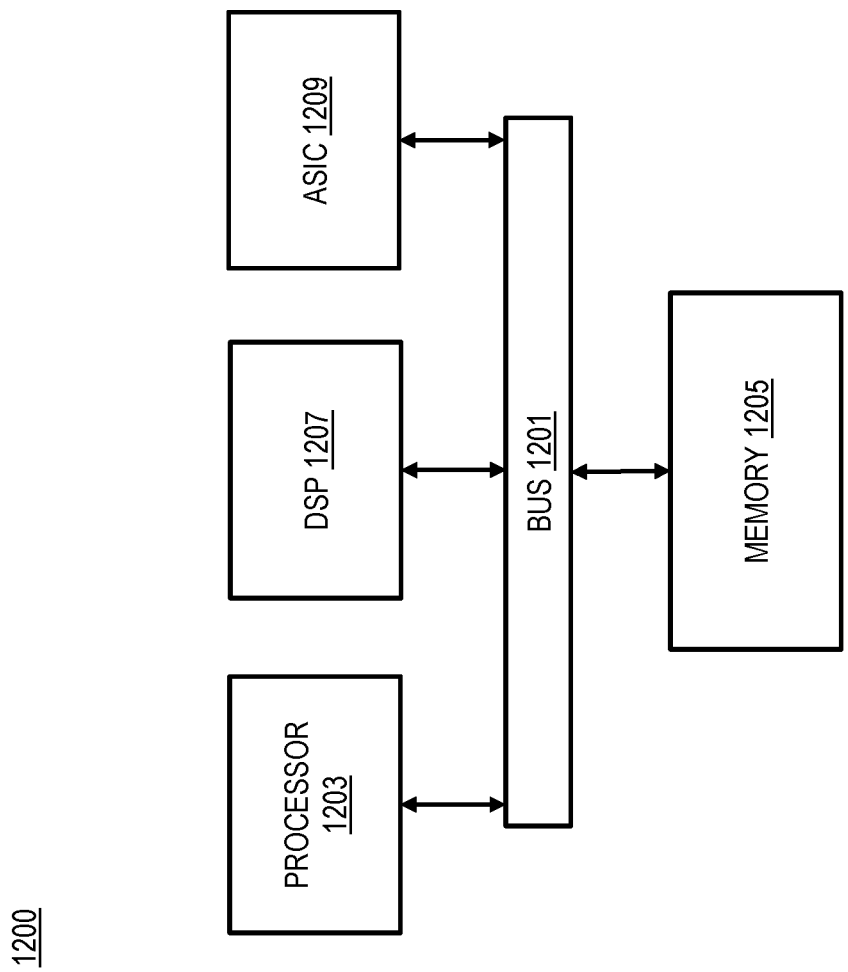
FIG. 12 is a diagram of a chip set that can be used to implement an embodiment.

FIG. 4 is a flowchart of a process for applying turning point detection to a probe trajectory, according to one embodiment. In various embodiments, the map matching platform 107 may perform one or more portions of the process 400 and may be implemented in, for instance, a chip set including a processor and a memory as shown in FIG. 12. As such, the map matching platform 107 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all the illustrated steps.

In step 401, the map matching platform 107 finds segments of a given trajectory such that each segment contains only low-speed probe points or contains a proportion of low-speed probe points greater than a threshold proportion.

In step 403, for each segment, the map matching platform 107 forms a line between the first and the last probe points and calculates the perpendicular distance by projecting each point of the segment to the line. If the maximum distance is larger than a threshold (e.g., 20 meters) (step 405), the map matching platform 107 splits the segment into two segments based on the point of the maximum distance and treats this point as the turning point (step 407).

In step 409, the map matching platform 107 recursively repeats steps 403-407 until the splitting rule is not satisfied (e.g., no segments remain that can be split according to the steps 403-407).

In step 411, the map matching platform 107 creates a new trajectory by, for instance, group-sorting high-speed points and turning points.

In step 413, the map matching platform 107 re-estimates the heading of each turning point using the bearing of the new trajectory. In one embodiment, the map matching platform 107 can then perform map matching on the re-estimated new trajectory.

FIG. 2B shows a new trajectory 209 constructed by the map matching platform 107 using turning points 211a-211c created from the low-speed probe points 205a-205c determined from the original trajectory 201 of FIG. 2A according the embodiments of the process 400. FIG. 2C illustrates the re-estimated heading of each turning point 211a-211c by the map matching platform 107 using the bearing of the new trajectory 209. In this example, the heading of turning point 211b has been changed the most (e.g., flipped in direction) based on the re-estimation of the heading by the map matching platform 107. It is worth noting that in some embodiments, the shape points of a curved road can also be classified as the turning point if the curvature is large enough.

In one embodiment, the map matching platform 107 can improve accuracy and robustness in light of potentially wrong map features by performing one or more feasibility checks as described below.

In a Viterbi algorithm for map matching, the transition between candidates of two consecutive probe points are taken to infer the traveling path on the road network, and the optimal matching path can be obtained efficiently by dynamic programming. For example, the shortest path method can be used to infer the traveling path in Viterbi-based map matching methods. Since the road network of a given map is generally connected, there must exist routes for every two locations on roads. As a result, existing methods should always return one best matching result with certain confidence. However, due to the design of the transition possibility function, the confidence is generally low when the transition distance is long.

Although the confidence measures the goodness of all possible matching paths for a given trajectory, it is challenging to have a universal threshold to determine the feasibility of the matching for any given trajectory and a road network. In general, it is very important to know whether the matching is feasible or not since the infeasibility might be caused by some wrong or incorrect map features (e.g., missing roads, wrong DoTs, etc.). On the other hand, the feasibility check can be helpful to detect/correct these wrong features. Taking the missing roads as an example, no route on the given network will exactly match to the true route of the probe trajectory if the feasibility check is available during the matching.

To solve these problems, in one embodiment, the map matching platform 107 defines a set of feasibility checks for a given road network and a probe trajectory, which can be naturally integrated into the Viterbi-based algorithm as constraints on its transition function. For example, the map matching platform 107 can verify every or some designated transition between two candidates of their corresponding probes. If all or greater than a threshold number of transitions are invalid, the matching becomes infeasible. In one embodiment, it is optional to continue the new matching process from the next point at the invalid location of the same trajectory. In one instance, the optional approach will produce matching results of multiple segments by neglecting the possibly wrong features, so that the matching of each segment is valid, but the matching of the whole trajectory is invalid. Embodiments of these constraints for the feasibility checks are described below.

In one embodiment, the map matching platform 107 can perform an off-road check as one feasibility check. If the minimum distance of one probe to every road in the road network is determined by the map matching platform 107 to be larger than a threshold, the probe is deemed an off-road probe. For example, the map matching platform 107 can use, but is not limited to using, 20 meters (or any other designated threshold) as a threshold for consumer grade raw GPS data, and a smaller distance threshold for commercial grade GPS data or post-processed data. An off-road probe cannot have its snap point on any of roads, so the transitions from a previous probe to this probe must be invalid. In one embodiment, the map matching platform 107 can perform the off-road check for every probe (or some designate subset of probes) of one trajectory and drop the off-road probes during the process of snap point generation. The advantage of this embodiment is that a small number of off-road probes will not break the matching results into segments since they are most likely from GPS or positioning shift error.

In one embodiment, the map matching platform 107 can perform a heading discrepancy check as one feasibility check. For example, an angle is calculated between the heading of a probe point and the bearing of the road the probe point snaps to. If the map matching platform 107 determines that the angle is larger than a threshold (e.g., 75 degrees), the transition from the previous point to the snapped point of this point is designated as invalid. By considering the DoT of the road, the bearing of the road also takes the DoT as the direction if the road is a one-directional road, otherwise the smallest angle between the heading of the point and the bearing of the road is used. However, the heading can be inaccurate in certain cases (e.g., a low-speed point, high building region, etc.). Accordingly, in one embodiment, for a low-speed probe point, the heading discrepancy check is not applied. Otherwise, the map matching platform 107 can maintain two sets of snapped points: one for valid heading discrepancy check and the other for invalid check. The two sets of snapped points will be leveraged by the embodiments of the mixed road network for handling wrong DoTs of roads in the given map described herein. Heading of a probe can be useful to match the probe to the correct road especially when road network is complicated. It is also less robust if a small number of random noises are added. The embodiments of the mixed road network described later can alleviate these problems.

Figure 5A:
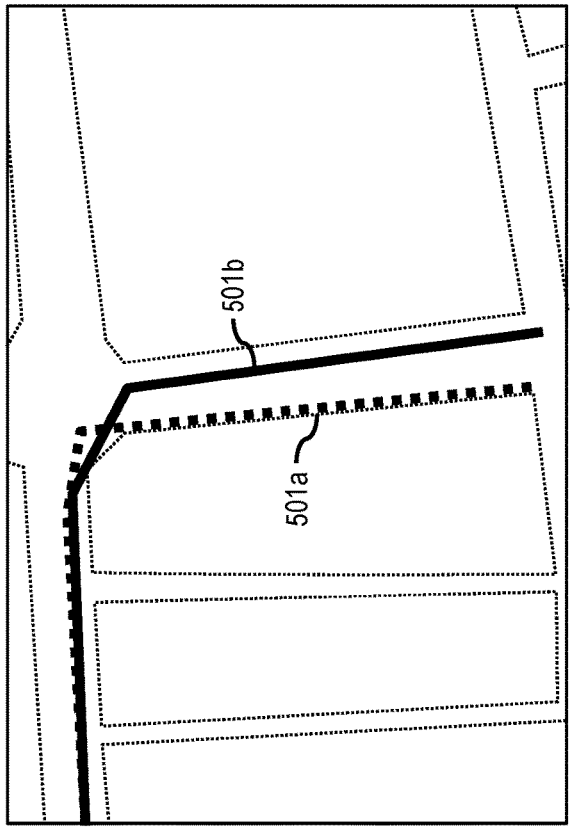
FIGS. 5A and 5B are diagrams illustrating an example of map matching a probe trajectory in a parallel road use case, according to one embodiment.
Figure 5B:
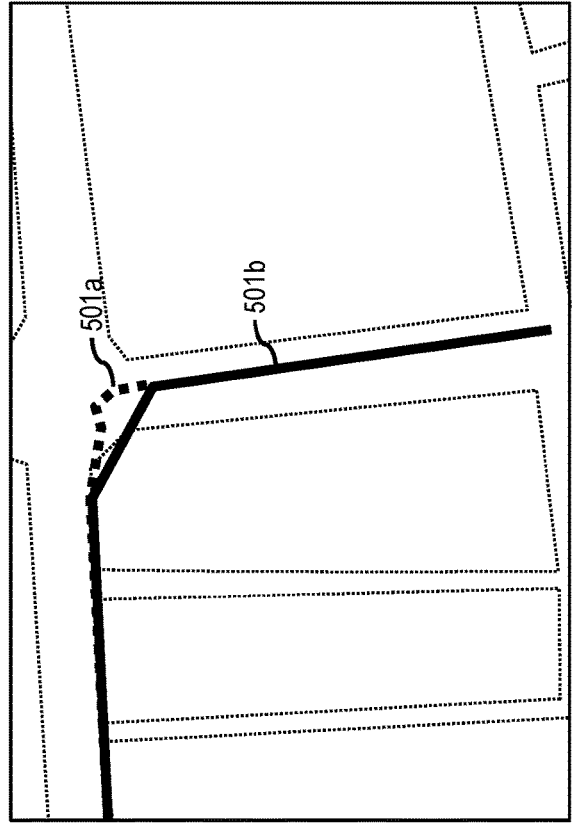

In one embodiment, the map matching platform 107 can perform a parallel road check as one feasibility check. Roads can be curved, so the angle between two roads can be measured by the map matching platform 107 by their segments. Since one probe point is required to snap to only one segment of a road (e.g., the closest segment of the point), the angle between two snapped roads turns out to be the angle of two snapped segments. In one embodiment, if the angle is less than a threshold (e.g., 10 degrees), the map matching platform 107 can designate the two roads as parallel. For multiple roads, the map matching platform 107 can compute a set of parallel segments such that the angle of any two segments in one set is smaller than the threshold. For each set of parallel segments, the map matching platform 107 can choose the one with the closest distance from the probe as the valid segment, and the other as the invalid segment. Like the heading discrepancy check, all or some designated number of snapped points can be classified by the map matching platform 107 according to the snapped segments and assigned to different sets of snapped points (valid and invalid). FIG. 5A illustrates an example of map matching to parallel roads without performing a parallel road check. In this example, one trajectory 501a is mapped to a first road (e.g., a side road with parking) and another trajectory 501b is mapped to another road parallel to the first road. As shown in FIG. 5B, with the application of the parallel road check according to the embodiments described above, both the trajectories 501a and 501b are mapped to the same correct roadway.

In one embodiment, the map matching platform 107 can perform an invalid transition check as one feasibility check. For two probes which are not off-road, the map matching platform 107 can always find a route between their corresponding snap points on the roads. Given two probes $p_1=(lat_1,lon_1,t_1,speed_1)$ and $p_2=(lat_2,lon_2,t_2, speed_2)$, the map matching platform 107 can compute a great-circle distance $d_g(p_1,p_2)$ on the road, the time interval $\Delta t=|t_1-t_2|$, and the maximum speed speed=max (speed$_1$, speed$_2$). Moreover, the travel distance on the road network between two snapped points can be calculated as $d_r(p_1, p_2)$. One simple and straightforward rule is Newton's Laws as expressed below:

$$d_r(p_1,p_2) \leq \text{speed} \times \Delta t. \quad \text{(Rule 1)}$$

Although road geometry is modeled as the center line of the road, the connection around intersection is not very accurate, so the traveling distance may vary considerably. Moreover, the maximum speed may cause a very loose upper bound of the distance. Hence, Rule 1 is very sensitive to the sampling frequency of the probes and the topology of road geometry. To alleviate the above issues, the map matching platform 107 can apply additional rules such as but not limited to Rules 2 and 3 described below. Rule 2 captures the relationship between the traveling distance and great-circle distance as:

$$3 \times d_g(p_1,p_2) \leq d_r(p_1,p_2). \quad \text{(Rule 2)}$$

The great-circle distance measures the line distance on the earth surface, which should be smaller than the traveling distance since roads can be curved. Rule 2 does not prefer the traveling path which takes three times (factor can be varied in some embodiments) more of great-circle distance, and otherwise the transition is designated as invalid. Rule 3 is to measure the deviation between a line segment and the traveling path. In one embodiment, the map matching platform 107 can define the perpendicular distance of traveling path to the line formed by $p_1$ and $p_2$ by the maximum distance from the node (or shape points) of every road inside the traveling path projected to the line, denoted by $d_p(p_1, p_2)$. The map matching platform 107 can designate a transition between two probe points as valid based on satisfying the following condition:

$$d_p(p_1,p_2) < \alpha \quad \text{(Rule 3)}.$$

where $\alpha=40$ meter or any distance that results in good matching performance. In one embodiment, if one of Rules 2 and 3 is not satisfied, the map matching platform 107 can designate the transition from $p_1$ to $p_2$ as invalid. For example, by comparing with an off-road parameter of 20 meters (or any other off-road threshold distance), the invalid transition allows two times the deviation for the nodes of the inferred road to the trajectory.

Figure 6A:
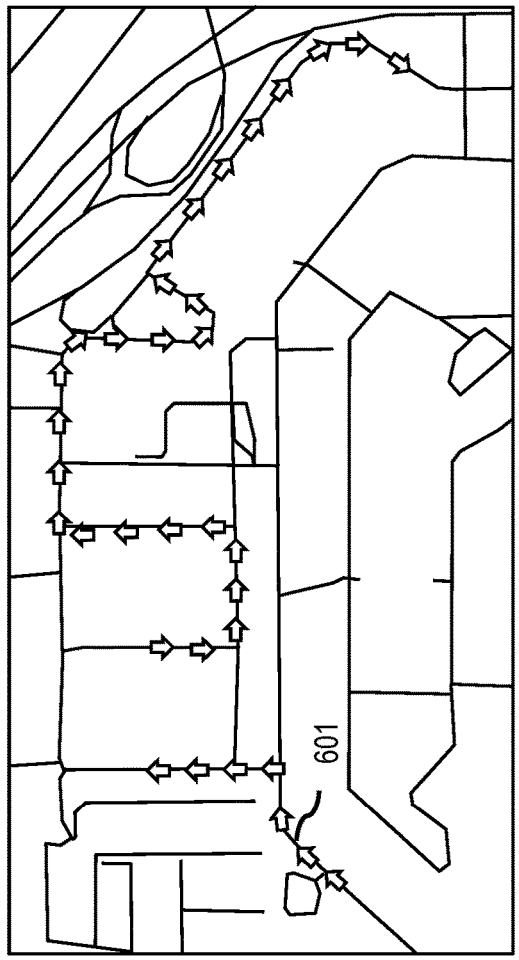
Figure 6B:
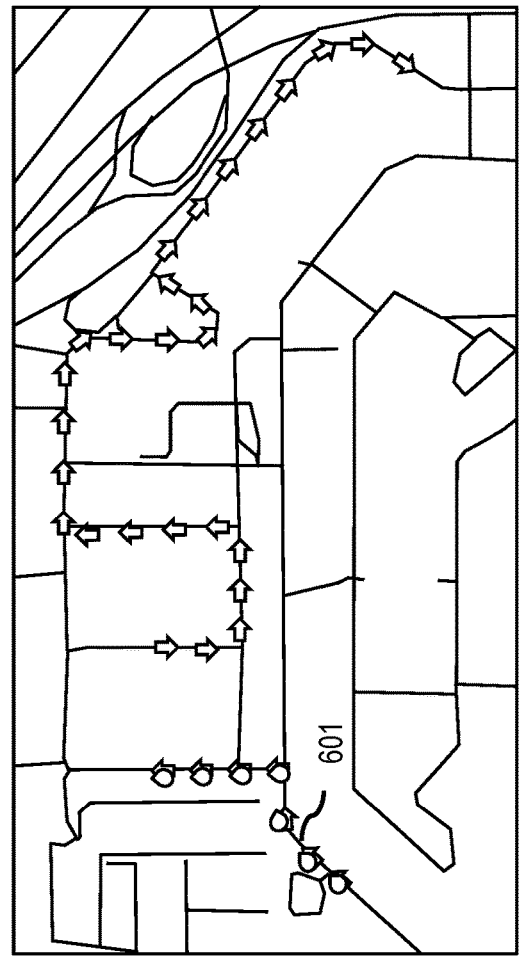

FIG. 6A illustrates an example in which the map matching platform 107 only performs Rule 1 of the invalid transition feasibility check on the one or more trajectories 601, and FIG. 6B illustrates the same example of FIG. 6A with both Rules 2 and 3 performed. Similarly, FIG. 6C illustrates another example in which the map matching platform 107 only performs Rule 1 on the one or more trajectories 603, and FIG. 6D illustrates the same example of FIG. 6C with both Rules 2 and 3.

In one embodiment, the map matching platform 107 can perform a high-order Viterbi check as one feasibility check.

Due to location shift or inaccurate road geometry, probes might be closer to the wrong roads. This is usually observed around an intersection with multiple roads. In one instance, the map matching platform 107 can take a high-order Viterbi inference approach to explore more historical matching results for feasible validation. In one instance, for three consecutive probe points, the map matching platform 107 can check if two traveling paths share the same intersection node and if the distance between the snapped point of the second road and the intersection node is smaller than a threshold (e.g., 40 meters). If so, it means that the U-turn path over the three probes exists as one of the candidate paths for the optimal matching result. To prevent this path from being selected by map matching platform 107 as the part of the optimal path, the map matching platform 107 can set the second order transition to be invalid. As a result, the optimal solution will never contain the U-turn path.

Figure 7A:
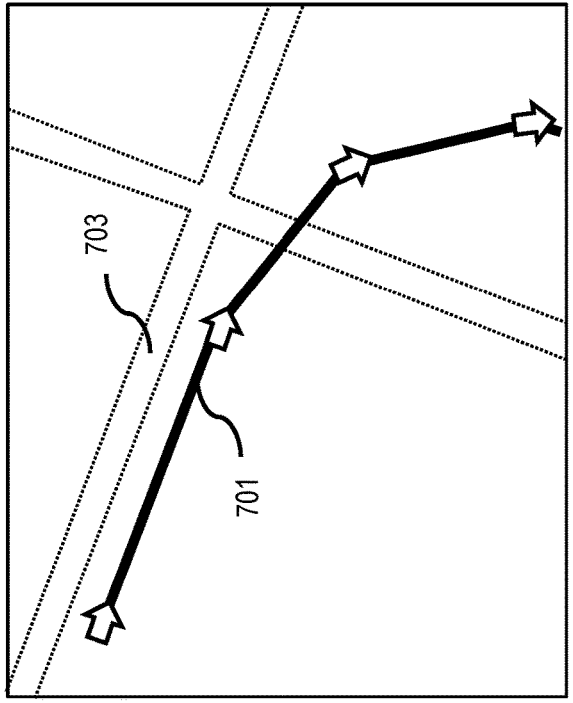
FIGS. 7A and 7B are diagrams illustrating an example high-order Viterbi check, according to one embodiment.
Figure 7B:
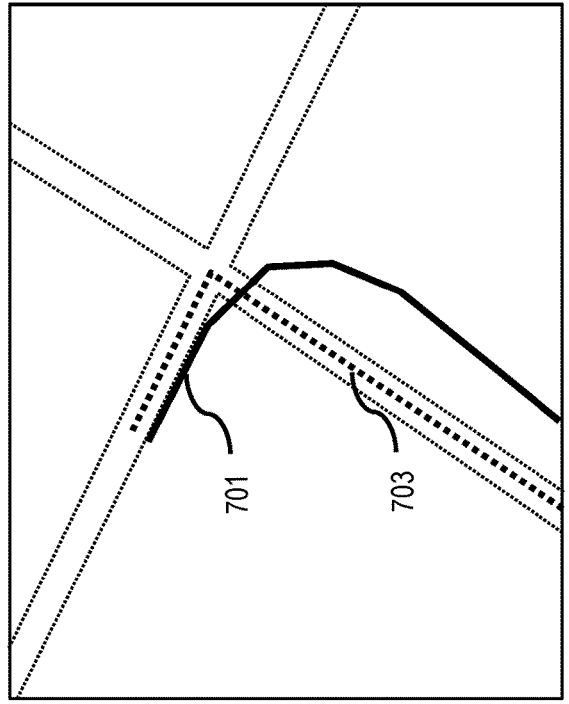

FIG. 7A illustrates an example in which the high-order Viterbi check is not performed on the trajectories 701 and 703, and FIG. 7B illustrates the same example of FIG. 7A with the high-order Viterbi check performed on the trajectories 701 and 703.

In one embodiment, the map matching platform 107 can match probe data to roads of wrong DoTs using a mixed road network. By way of example, the representation of a road network is very important for a path-based map matcher. For example, in one embodiment, the representation can be based on a reference node of road links selected based on their spatial relationship (e.g., always selecting the southwest most node of a link as the reference node). Then the DoT can be expressed in relation to the reference node (e.g., direction heading towards or away from the reference node). Some road features are related to the direction of the roads such as the direction of travel on one road, and restricted driving maneuver on multiple roads. A directed road network is often used since it can remove the ambiguity of matching one probe point to multiple roads in the search radius by using the heading of the probe. Moreover, it can take prior information of DoTs for certain roads, such as multi-digitalized roads and roundabouts. However, this may cause another incorrect matching result if the DoT of the road is wrong. In contrast, an undirected road network does not take DoTs into consideration, so it is less robust to noisy probe and complex road networks, and often contradicts with the shortest path search. To solve these issues, in one embodiment, the map matching platform 107 can employ a mixture of directed and undirected road networks as the base network in its map matcher design.

In one embodiment, the map matching platform 107 can assume that most of DoTs in the map data of the geographic database 105 are correct and a very few of them are incorrect. Hence, the directed road network should be the first choice for map matching. As discussed above, the map matching platform 107 has a few sets of feasibility checks to verify whether the matching from one probe to another probe is feasible. Based on the feasibility check, the map matching platform 107 can make the switch from a directed road network to an undirected road network when the matching is infeasible on the directed road network. In the Viterbi algorithm example, this can be implemented by splitting the candidates into two sets: a directed set and an undirected set.

In one embodiment, a directed candidate set indicates that the candidate road/segment follows the constraints on the heading of probe and the road bearing. In contrast, an undirected candidate set includes all candidates inside the search radius of one probe excluding the directed candidate set.

Based on the above definitions of directed and undirected sets, the two sets are mutually exclusive. In one embodiment, the logic of the Viterbi algorithm or a process using directed and undirected sets can be described with respect to the diagram of FIG. 8 and the flowchart of FIG. 9.

Figure 9:
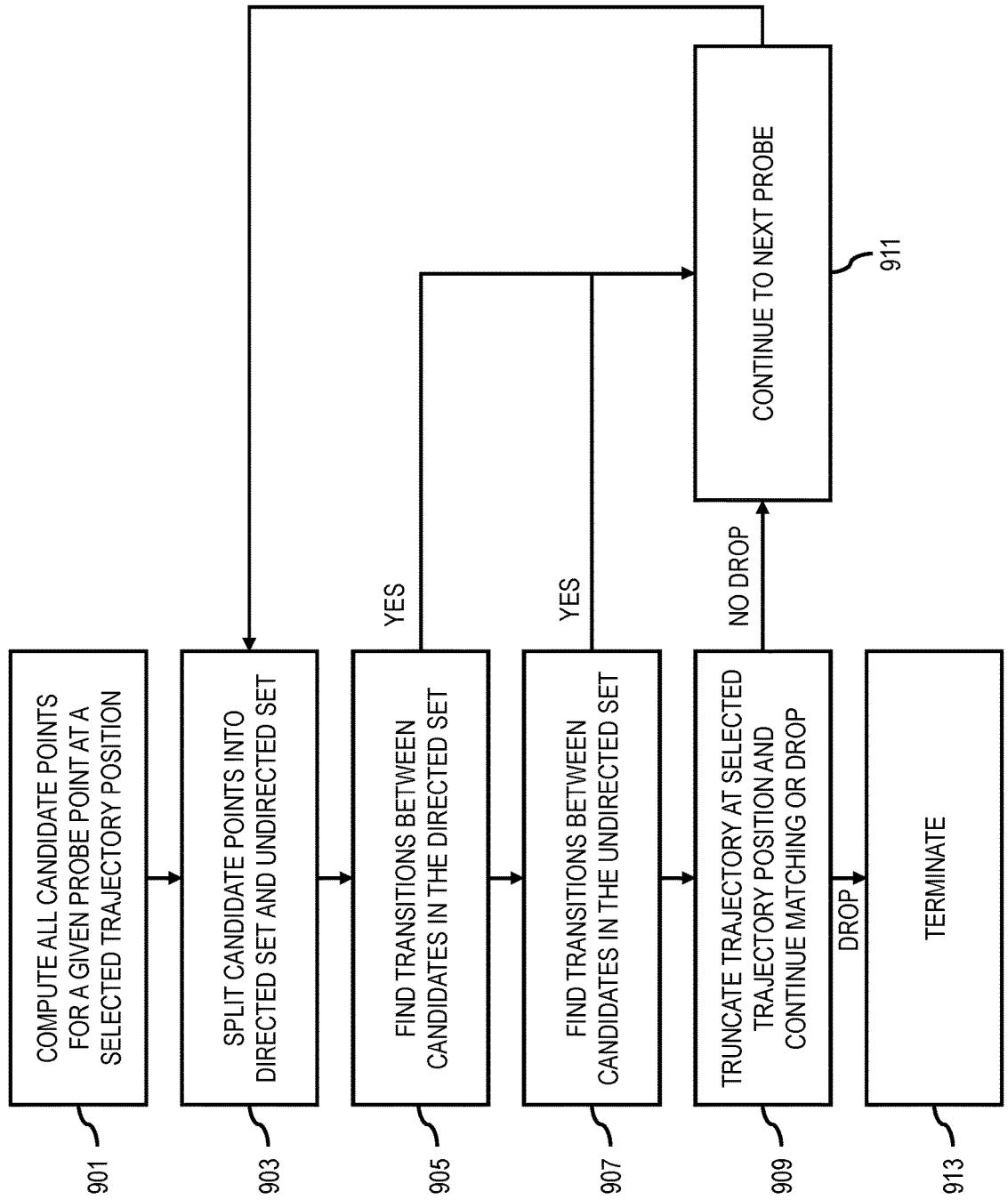
FIG. 9 is flowchart of a process for matching roads of wrong directions of travel (DoTs) using a mixed road network, according to one embodiment.

FIG. 9 is flowchart of a process for matching roads of wrong directions of travel (DoTs) using a mixed road network, according to one embodiment. In various embodiments, the map matching platform 107 may perform one or more portions of the process 900 and may be implemented in, for instance, a chip set including a processor and a memory as shown in FIG. 12. As such, the map matching platform 107 can provide means for accomplishing various parts of the process 900, as well as means for accomplishing embodiments of other processes described herein in conjunction with other components of the system 100. Although the process 900 is illustrated and described as a sequence of steps, its contemplated that various embodiments of the process 900 may be performed in any order or combination and need not include all the illustrated steps.

Figure 8:
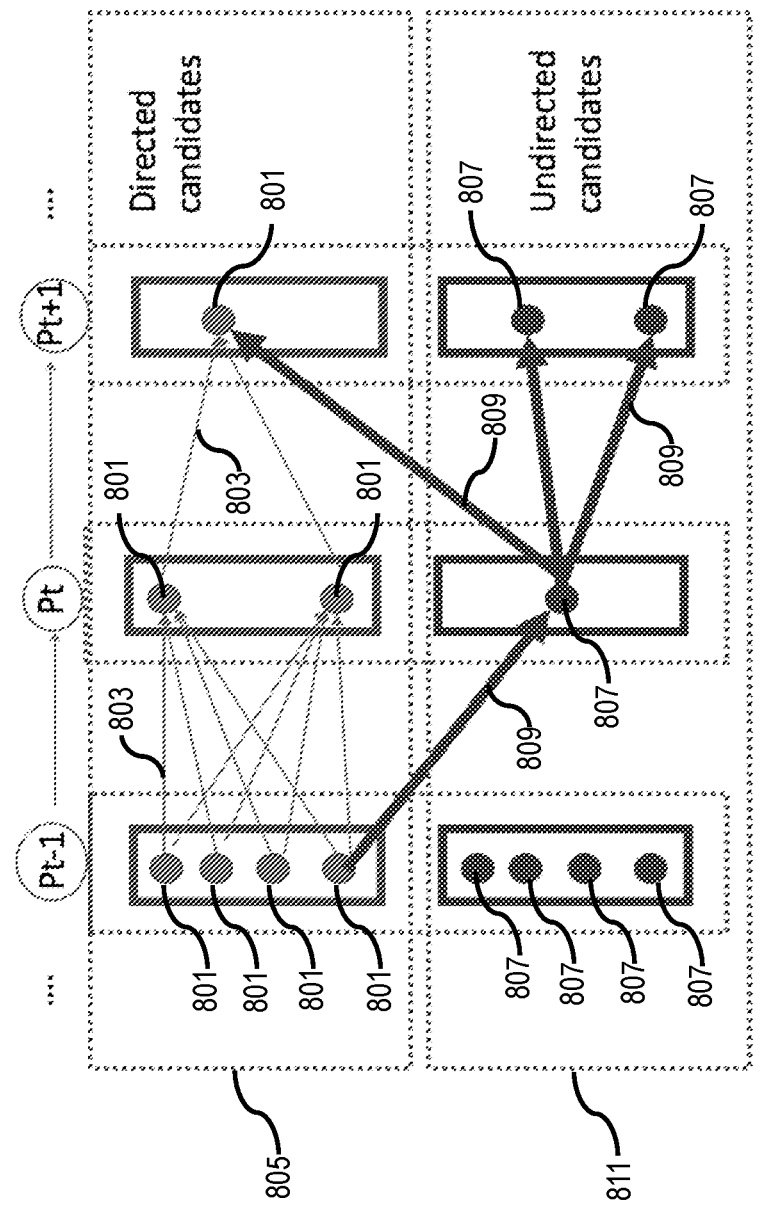
FIG. 8 is a diagram illustrating an example of matching roads of wrong directions of travel (DoTs) using a mixed road network, according to one embodiment.

As shown in FIG. 8, $P_t$ represents the probe point at the tth position of a given trajectory. In this example, the circles 801 and arrows 803 in the top section 805 of the diagram 800 stand for the candidates and transitions between directed candidates between neighbor probes, while the circles 807 and arrows 809 in the bottom section 811 of the diagram stand for the candidates and transitions between any two candidates except two directed candidates. This is because an undirected road network covers the directed road network. Without the loss of generality, the matching proceeds from $P_t$ to $P_{t+1}$ are described as follows:

In step 901, given a probe $P_{t+1}$, the map matching platform 107 compute all the candidates $C^{t+1}$. In other words, the map matching platform 107 computes all candidate points for a given probe point at a selected trajectory position.

In step 903, the map matching platform 107 splits $C^{t+1} = C_d^{t+1} \cup C_u^{t+1}$ into directed set $C_d^{t+1}$ and undirected set $C_u^{t+1}$ (e.g., split the candidate probe points into a directed set and undirected set).

In step 905, the map matching platform 107 finds all transition from $C_d^t$ to $C_d^{t+1}$ (directed set) and checks the feasibility (e.g., according to the embodiments of the feasibility checks described above). If it is feasible, the map matching platform 107 finds the best path from the beginning until time t. In one embodiment, the map matching platform 107 can then return to step 903 and proceed with the next candidate probe point.

In step 907, the map matching platform 107 finds all transitions from $C_d^t$ to $C_u^{t+1}$ (undirected set) and checks the feasibility. If it is feasible, the map matching platform 107 finds the best path. In one embodiment, the map matching platform 107 can then return to step 903 and proceed with the next candidate probe point.

In step 909, the map matching platform 107 can truncate the trajectory at time t, and can continue matching starting from t+1 (step 911), or can drop the whole trajectory (step 913).

In one embodiment, the map matching platform 107 can correct wrong DoTs in step 907 by leveraging the undirected graph as the base graph if the feasibility check becomes true. Otherwise, in step 909, the map matching platform 107 will either drop the whole trajectory or continue matching the following part of trajectory without considering the previous part as the historical information. In one embodiment, the map matching platform 107 can be configured to drop the whole trajectory to enhance the matching accuracy. In other applications, such as missing geometry detection, the map matching platform 107 can be configured to obtain multiple matching segments so that the unmatched probes or invalid transitions can be very good indictors for determining new geometries. In addition, restricted driving maneuver (RDM) can also benefit from the corrected DoTs of roads. Since RDM depends on the DoTs of a sequence of roads, the map matching platform 107 can change the feature if any one of the roads has a DoT change. For example, if two roads are opposite one-directional roads, the map matching platform 107 can determine that the two roads form an RDM; however, that determination may be due to the outdated DoT features. In this case, matching to the wrong DoTs can help the map matching platform 107 detect the RDM change because there are many routes passing through this RDM.

As discussed above, the detection and/or correction of the wrong map features as described in the various embodiments can be used for any number of applications. For example, locations or road segments associated with invalid feasibility checks performed during map matching can be used to indicate new road geometries, wrong or out-of-date map features, missing map features, and/or the like. In one embodiment, the results of the map matching and/or feasibility checks can be fed into a map making pipeline for processing to discover new road geometries or map features, or to update existing road geometries or map features. In other words, the map service provider (or the map matching platform 107 itself) can generate new map data, updated map data, or a combination thereof based on the detected wrong map feature, the map matching of probe trajectories, or a combination thereof.

In another example use case, the detected wrong map features, map matching results, and/or any other output the map matching platform 107 can be used to generate improved navigation guidance information. The embodiments described herein can be used to improve map matching results when location accuracy is poor such as but not limited to: (1) traveling in areas with GPS signal interference; (2) when a user device has lower quality or less accurate positioning sensors; etc. The map matching results are then more likely to place or snap the user's position to a more accurate road segment from which correct navigation instructions can be generated. For example, in the case where a user is traveling on a road segment that is close to another parallel road, positioning error can make it difficult for a navigation system to identify which of the two parallel roads the user is traveling on. Incorrect map matching would result in providing incorrect navigation guidance. Thus, the map matching processes described herein can be used to more accurately map match the user in such a situation to provide navigation guidance for the appropriate road segment and, therefore, improve the user's navigation experience.

In another example use case, the detected wrong map features, map matching results, and/or other output of the map matching platform 107 can be used to obtain location intelligence about a given location. For example, the improved map matching results can provide more accurate data on the spatial relationships of the road network and related map features so that visual representations of georeference data (e.g., the location intelligence) can be more accurately depicted on a corresponding map.

In another example use case, as noted above, the map matching platform 107 can identify transitions between on-road and off-road (e.g., via the feasibility checks) to determine locations or road segments (e.g., parking accessors) that are used by drivers to access or leave parking locations. These parking locations can be off-street (e.g., indicated by a transition between on-road and off-road probes) or on-street (e.g., where the transition occurs between two on-road probes). It is contemplated that the map matching platform 107 can use any rule, criteria, algorithm, or logic to identify parking accessors based on probe transitions.

In another example use case, the output of the map matching platform 107 can be used to improve autonomous driving or highly assisted driving. For example, in many cases, autonomous or highly-assisted-driving (HAD) vehicles are configured to exit autonomous or HAD driving modes when positioning or map accuracy is below a threshold accuracy. By using the embodiments of the map matching platform 107 described herein to improve map matching accuracy, the map matching platform 107 can provide map matching results with improved accuracy so that autonomous or HAD vehicles can remain in autonomous or HAD modes longer or to return to such modes more quickly than traditional approaches.

In yet another embodiment, the output of the map matching platform 107 can be used to provide improved navigation on the last mile solution of a trip. The last mile, for instance, refers to the final leg of a multi-modal trip to reach a destination. For example, the last mile can be the portion of the trip from a public transport station (e.g., a train station) to a user's final destination (e.g., home, work, a point of interest (POI), etc.). Generally, map data on the last mile is more likely to be incomplete or out-of-date because such routes are often less traveled or have fewer map surveyors visiting those locations. In this case, improved map matching results can be used to provide higher accuracy navigation guidance despite the potential for the underlying map data to be wrong, out-of-date, or missing.

Returning to FIG. 1, as shown, the system 100 comprises one or more vehicles 101*a*-101*n* (also collectively referred to as vehicles 101) and one or more user equipment (UE) devices 103*a*-103*n* (also collectively referred to as UEs 103) that act as probes traveling over a road network (e.g., the transportation network 109). Although the vehicles 101 are depicted as automobiles, it is contemplated that the vehicles 101 can be any type of transportation vehicle, manned or unmanned (e.g., planes, aerial drone vehicles, motor cycles, boats, bicycles, etc.), and the UEs 103 can be associated with any of the types of vehicles or a person or thing (e.g., a pedestrian) traveling within the transportation network 109. In one embodiment, each vehicle 101 and/or UE 103 is assigned a unique probe identifier (probe ID) for use in reporting or transmitting probe data collected by the vehicles 101 and/or the UEs 103. In one embodiment, each vehicle 101 and/or UE 103 is configured to report probe data as probe points, which are individual data records collected at a point in time that records telemetry data for that point in time. The probe points can be reported from the vehicles 101 and/or the UEs 103 in real-time, in batches, continuously, or at any other frequency requested by the system 100 over, for instance, the communication network 111 for processing by the map matching platform 107.

In one embodiment, a probe point can include attributes such as: probe ID, longitude, latitude, speed, and/or time. The list of attributes is provided by way of illustration and not limitation. Accordingly, it is contemplated that any combination of these attributes or other attributes may be recorded as a probe point (e.g., such as those previously discussed above). For example, attributes such as altitude (e.g., for flight capable vehicles or for tracking non-flight vehicles in the altitude domain), tilt, steering angle, wiper activation, etc. can be included and reported for a probe point. In one embodiment, if the probe point data includes altitude information, the transportation network, links, etc. can also be paths through an airspace (e.g., to track aerial drones, planes, other aerial vehicles, etc.), or paths that follow the contours or heights of a road network (e.g., heights of different ramps, bridges, or other overlapping road features).

In one embodiment, the vehicles 101 and/or the UEs 103 may include sensors for reporting measuring and/or reporting attributes. The attributes can also be any attribute normally collected by an on-board diagnostic (OBD) system of a vehicle 101, and available through an interface to the OBD system (e.g., OBD II interface or other similar interface).

In one embodiment, the system 100 can build trajectories using probe provider information and/or probe identifier (probe ID) information associated with the probe data. For example, the system 100 builds the trajectories by matching the probe points in the probe data according to probe identifier and sequencing the probe points according to time. In this way, the trajectory can identify the movement path of the respective probe or device within the bounded geographic area over a time range covered by the probe data. Because the trajectories are made of individual probe points, each point in the trajectory also has the properties or attributes recorded for each probe point. Accordingly, in one embodiment, a machine learning approach to point-based map matching can be used to further determine which probe points to include in a particular sequence or trajectory. For example, at any given point along the trajectory, a heading, speed, position, etc. of the probe point can be determined for a candidate probe point. Then, the existing trajectory to which a probe point might be added can be assumed by the system 100 to be equivalent to a link against which the probe point can be matched. Accordingly, attributes of the trajectory can then be extracted to create a candidate probe point and link/trajectory pair for classification by the map matching platform 107.

In one embodiment, the map matching platform 107 performs the processes for map matching of the collected probe points according to various embodiments described herein. By way of example, the map matching platform 107 can be a standalone server or a component of another device with connectivity to the communication network 111. For example, the component can be part of an edge computing network where remote computing devices (not shown) are installed along or within proximity of the transportation network 109 to provide map matching of probe data collected locally or within a local area served by the remote or edge computing device.

In one embodiment, the map matching platform 107 has connectivity or access to a geographic database 105 that includes mapping data about a road network (additional description of the geographic database 105 is provided below with respect to FIG. 10). In one embodiment, the probe data, map matching results, and/or related information can also be stored in the geographic database 105 by the map matching platform 107. In addition or alternatively, the probe data can be stored by other components of the system 100 in the geographic database 105 for subsequent retrieval and processing by the map matching platform 107.

In one embodiment, the vehicles 101 and/or UEs 103 may execute one or more applications 113a-113n (also collectively referred to as applications 113) to present or use the results of point-based map matching generated by the map matching platform 107 according to the embodiments described herein. For example, if the application 113 is a navigation application, then the map matching results can be used to determine positioning information, routing information, provide updated estimated times of arrival (ETAs), and the like.

By way of example, the UEs 103 can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UEs 103 can support any type of interface to the user (such as "wearable" circuitry, etc.). In one embodiment, the UEs 103 may be associated with a vehicle 101 (e.g., cars), a component part of the vehicle 101 (e.g., an embedded navigation system), a mobile device (e.g., phone), and/or a combination of thereof. Similarly, the vehicle 101 may include computing components that can perform all or a portion of the functions of a UE 103.

By way of example, the applications 113 may be any type of application that is executable at the vehicles 101 and/or the UEs 103, such as mapping applications, location-based service applications, navigation applications, content provisioning services, camera/imaging application, media player applications, social networking applications, calendar applications, and the like. In one embodiment, an application 113 may act as a client for the map matching platform 107 and perform one or more functions of the map matching platform 107 alone or in combination with the platform 107.

In one embodiment, the vehicles 101 and/or the UEs 103 are configured with various sensors for generating probe data. By way of example, the sensors may include a global positioning sensor for gathering location data (e.g., GPS), Light Detection And Ranging (LiDAR) for gathering distance data and/or generating depth maps, infrared sensors for thermal imagery, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture obstructions for analysis and documentation purposes), an audio recorder for gathering audio data, velocity sensors mounted on steering wheels of the vehicles, switch sensors for determining whether one or more vehicle switches are engaged, and the like.

In another embodiment, the sensors of the vehicles 101 and/or the UEs 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of a vehicle 101 may detect the relative distance of the vehicle 101 from lane or roadways, the presence of other vehicles, pedestrians, traffic lights, potholes and any other objects, or a combination thereof. In one scenario, the sensors may detect weather data, traffic information, or a combination thereof. In one example embodiment, the vehicles 101 and/or the UEs 103 may include GPS receivers to obtain geographic coordinates from satellites 115 for determining current location and time associated with the vehicles 101 and/or the UEs 103 for generating probe data. Further, the location can be determined by a triangulation system such as A-GPS, Cell of Origin, or other location extrapolation technologies.

The communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the map matching platform 107 may be a platform with multiple interconnected components. The map matching platform 107 may include multiple servers, intelligent networking devices, computing devices, components and corresponding software for providing trajectory bundles for map data analysis. In addition, it is noted that the map matching platform 107 may be a separate entity of the system 100, a part of one or more services 117a-117m (also collectively referred to as services 117) of the services platform 119, or included within the UEs 103 (e.g., as part of the applications 113).

The services platform 119 may include any type of service 117. By way of example, the services 117 may include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services platform 119 may interact with the map matching platform 107, the vehicles 101, the UEs 103, and/or one or more content providers 121a-121k (also collectively referred to as content providers 121) to provide the services 117.

In one embodiment, the content providers 121 may provide content or data to the vehicles 101 and/or the UEs 103, the map matching platform 107, and/or the services 117. The content provided may be any type of content, such as mapping content, textual content, audio content, video content, image content, etc. In one embodiment, the content providers 121 may provide content that may aid in the point-based map matching using a machine learning approach according to the various embodiments described herein. In one embodiment, the content providers 121 may also store content associated with the vehicles 101, the UEs 103, the map matching platform 107, and/or the services 117. In another embodiment, the content providers 121 may manage access to a central repository of data, and offer a consistent, standard interface to data, such as a repository of probe data, probe features/attributes, link features/attributes, etc. Any known or still developing methods, techniques or processes for retrieving and/or accessing feature values for probe points and/or road links from one or more sources may be employed by the map matching platform 107.

By way of example, the vehicles 101, the UEs 103, the map matching platform 107, the services platform 119, and/or the content providers 121 communicate with each other and other components of the system 100 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 10:
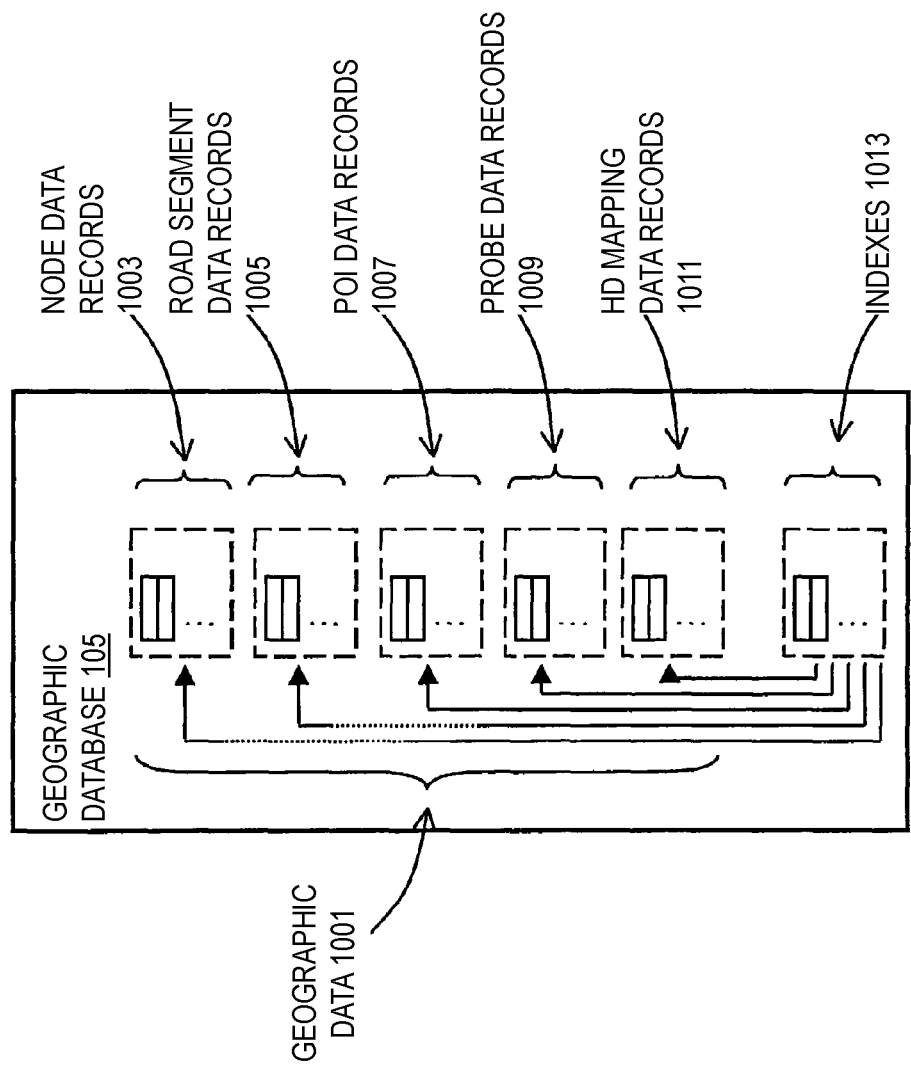
FIG. 10 is a diagram of a geographic database, according to one embodiment.

FIG. 10 is a diagram of a geographic database 105, according to one embodiment. In one embodiment, the geographic database 105 includes geographic data 1001 used for (or configured to be compiled to be used for) mapping and/or navigation-related services. In one embodiment, the geographic database 105 include high resolution or high definition (HD) mapping data that provide centimeter-level or better accuracy of map features. For example, the geographic database 105 can be based on Light Detection and Ranging (LiDAR) or equivalent technology to collect billions of 3D points and model road surfaces and other map features down to the number lanes and their widths. In one embodiment, the HD mapping data (e.g., HD mapping data records 1011) can capture and store details such as the slope and curvature of the road, lane markings, roadside objects such as signposts, including what the signage denotes. By way of example, the HD mapping data enable highly automated vehicles to precisely localize themselves on the road, and to determine map data updates (e.g., learned speed limit values) to at high accuracy levels.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 105.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 105 follows certain conventions. For example, links do not cross themselves and do not cross each other except at a node. Also, there are no duplicated shape points, nodes, or links. Two links that connect each other have a common node. In the geographic database 105, overlapping geographic features are represented by overlapping polygons. When polygons overlap, the boundary of one polygon crosses the boundary of the other polygon. In the geographic database 105, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the geographic database 105 is stored as a hierarchical or multi-level tile-based projection or structure. More specifically, in one embodiment, the geographic database 105 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has $2(n+1)$ cells. Accordingly, any tile of the level (n) has a geographic area of $A/2(n+1)$ where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

As shown, the geographic database 105 includes node data records 1003, road segment or link data records 1005, POI data records 1007, probe data records 1009, HD mapping data records 1011, and indexes 1013, for example. More, fewer or different data records can be provided. In one embodiment, additional data records (not shown) can include cartographic ("cartel") data records, routing data, and maneuver data. In one embodiment, the indexes 1013 may improve the speed of data retrieval operations in the geographic database 105. In one embodiment, the indexes 1013 may be used to quickly locate data without having to search every row in the geographic database 105 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points corresponding to the respective links or segments of the road segment data records 1005. The road link data records 1005 and the node data records 1003 represent a road network, such as used by vehicles, cars, and/or other entities. Alternatively, the geographic database 105 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 105 can include data about the POIs and their respective locations in the POI data records 1007. The geographic database 105 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 105 includes probe data records 1009 which store probe point data, probe feature/attribute values, feature set data, map matching classifications, and/or related information. For example, the probe data records 1009 can store collected probe point data for map matching, and/or the ground truth probe point data collected to train a machine learning classifier of the map matching platform 107. In yet another embodiment, the probe data records 1009 can store processed probe point data into data buckets for matched probe points and for unmatched probe points.

In one embodiment, as discussed above, the HD mapping data records 1011 model road surfaces and other map features to centimeter-level or better accuracy. The HD mapping data records 1011 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 1011 are divided into spatial partitions of varying sizes to provide HD mapping data to vehicles 101 and other end user devices with near real-time speed without overloading the available resources of the vehicles 101 and/or the UEs 103 (e.g., computational, memory, bandwidth, etc. resources).

In one embodiment, the HD mapping data records 1011 are created from high-resolution 3D mesh or point-cloud data generated, for instance, from LiDAR-equipped vehicles 101. The 3D mesh or point-cloud data are processed to create 3D representations of a street or geographic environment at centimeter-level accuracy for storage in the HD mapping data records 1011.

In one embodiment, the HD mapping data records 1011 also include real-time sensor data collected from probe vehicles 101 in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 105 can be maintained by the content providers 121 in association with the services platform 119 (e.g., a map developer). A map developer can collect geographic data to generate and enhance the geographic database 105. There can be different ways used by the map developer to collect data. These ways can include obtaining data from other sources, such as municipalities or respective geographic authorities. In addition, the map developer can employ field personnel to travel by vehicle (e.g., vehicles 101) along roads throughout the geographic region to observe features and/or record information about them (e.g., using a UE 103), for example. Also, remote sensing, such as aerial or satellite photography, can be used.

The geographic database 105 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicle 101 or a EU 103. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing a map matcher tolerant to wrong map features may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
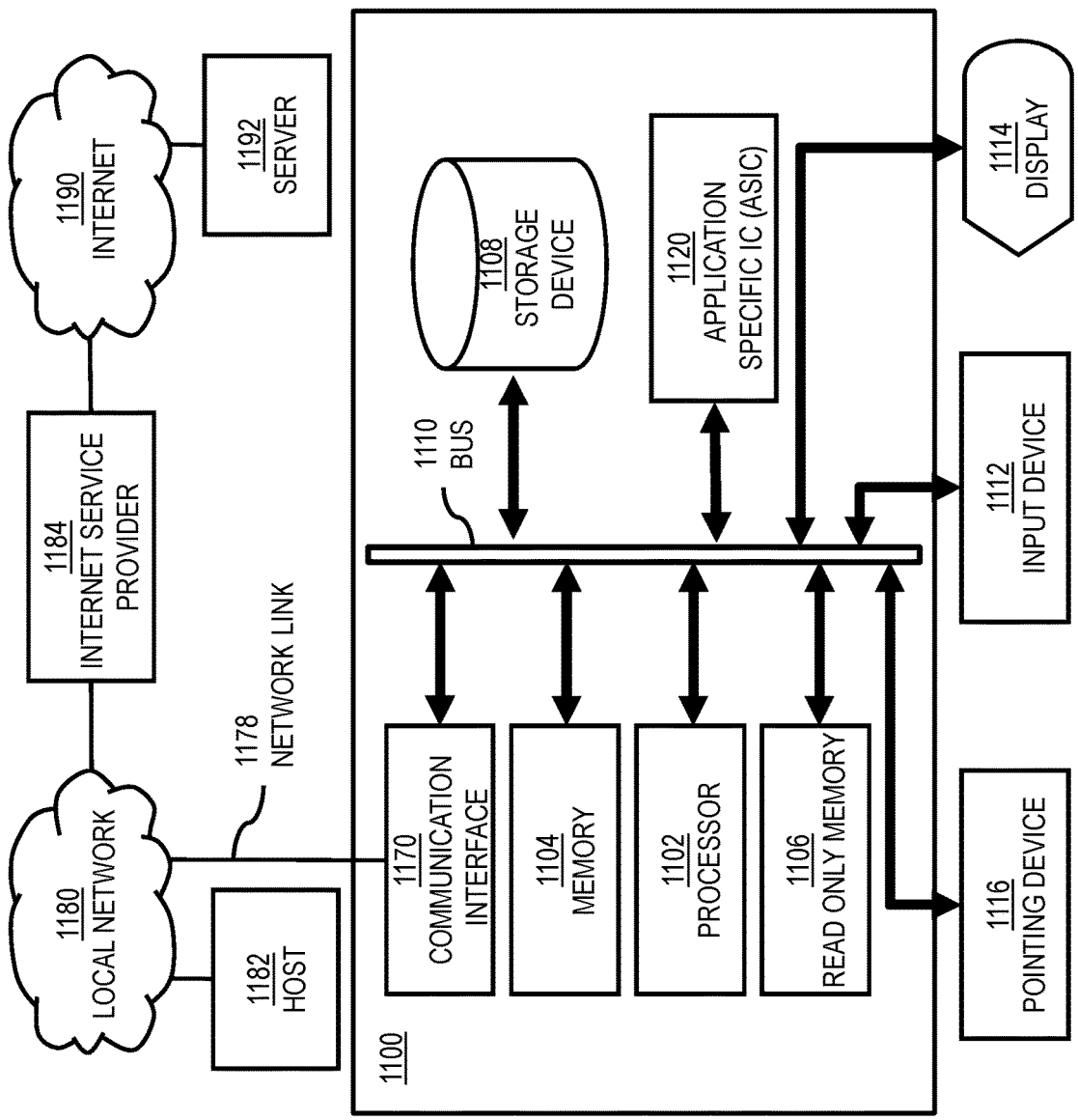
FIG. 11 is a diagram of hardware that can be used to implement an embodiment.

FIG. 11 illustrates a computer system 1100 upon which an embodiment of the invention may be implemented. Computer system 1100 is programmed (e.g., via computer program code or instructions) to provide a map matcher tolerant to wrong map features as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to providing a map matcher tolerant to wrong map features. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for providing a map matcher tolerant to wrong map features. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing a map matcher tolerant to wrong map features, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 111 for providing a map matcher tolerant to wrong map features.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system can be deployed in various configurations within other computer systems, e.g., host 1182 and server 1192.

FIG. 12 illustrates a chip set 1200 upon which an embodiment of the invention may be implemented. Chip set 1200 is programmed to provide a map matcher tolerant to wrong map features as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide a map matcher tolerant to wrong map features. The memory 1205 also stores the data associated with or generated by the execution of the inventive steps.

Figure 13:
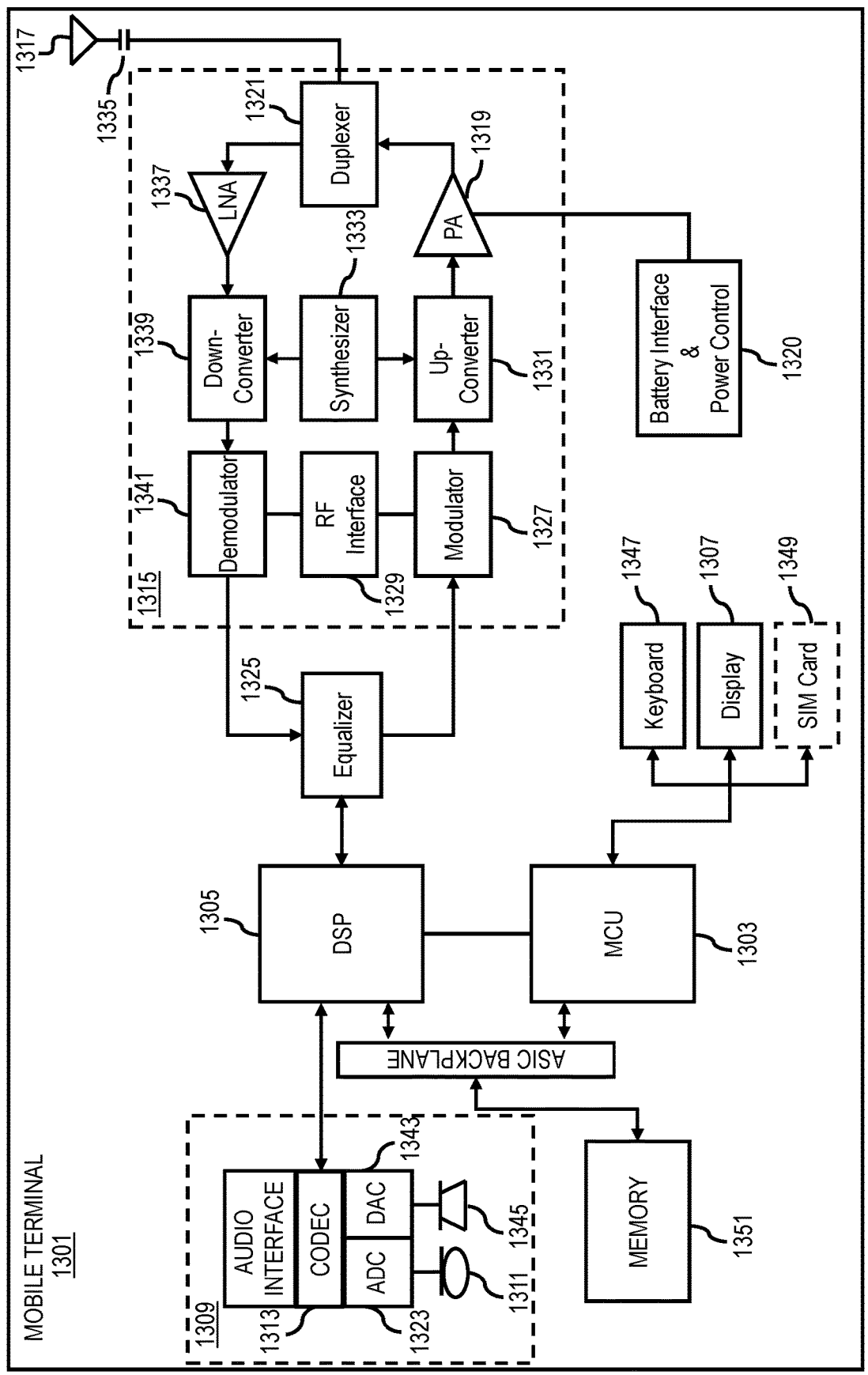
FIG. 13 is a diagram of a mobile terminal (e.g., handset or vehicle or part thereof) that can be used to implement an embodiment.

FIG. 13 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to provide a map matcher tolerant to wrong map features. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    finding, by a computer-implemented map matcher, one or more segments of a probe trajectory the probe trajectory comprising a plurality of probe points and the one or more segments containing a sub-set of the plurality of probe points that are a plurality of low-speed probe points, wherein the plurality of low-speed probe points are traveling below a speed threshold, and wherein the computer-implemented map matcher uses a map matching technology to match the plurality of probe points of the probe trajectory to a road network stored in digital map data of a geographic database;
    for each segment of the one or more segments, forming, by the computer-implemented map matcher, a line between a first probe point and a last probe point of the sub-set of the plurality of probe points of each segment;
    calculating, by the computer-implemented map matcher, a distance from each probe point of the sub-set of the plurality of probe points of each segment to the line;
    splitting, by the computer-implemented map matcher, each segment based on comparing the distance to a threshold at a turning point of each segment;
    creating, by the computer-implemented map matcher, a new probe trajectory based on a plurality of high-speed probe points in the probe trajectory and the turning point of each segment, wherein the plurality of high-speed probe points are traveling above the speed threshold;
    estimating, by the computer-implemented map matcher, a heading of the turning point of each segment based on the new trajectory; and
    performing, by the computer-implemented map matcher, a feasibility check between two consecutive probe points of the new trajectory,
    wherein the feasibility check verifies a validity of a transition between the two consecutive probe points with respect to the road network stored in the digital map data of the geographic database, and
    wherein a map matching of the new trajectory, by the computer-implemented map matcher, is based on the feasibility check.

2. The method of claim 1, further comprising:
    detecting a wrong map feature in the geographic database used for the map matching based on the feasibility check.

3. The method of claim 2, wherein the feasibility check comprises:
classifying the two consecutive probe points of the new trajectory as off-road based on a distance threshold from a road segment of the road segment; and
excluding at least one probe point of the two consecutive probe points classified as off-road from the map matching.

4. The method of claim 2, wherein the feasibility check comprises:
calculating an angle formed by a heading of the two consecutive probe points of the new trajectory and a bearing of a road segment of the road network on which at least one probe point of the two consecutive probe points is snapped; and
designating the at least one probe point as invalid based on a comparison of the angle to a threshold value.

5. The method of claim 2, wherein the feasibility check comprises:
determining two road segments in proximity to at least one probe point of the two consecutive probe points of the new trajectory;
calculating an angle between the two road segments;
classifying the two road segments as parallel based on a comparison of the angle to a threshold value; and
designating one road segment of the two road segments as valid based on a proximity to the at least one probe point.

6. The method of claim 2, wherein the feasibility check comprises:
determining a difference between a great-circle distance and a traveling distance between the two consecutive probe points of the new trajectory; and
designating the transition between the two consecutive probe points as invalid based on a comparison of the great-circle distance and the traveling distance.

7. The method of claim 2, wherein the feasibility check comprises:
determining a deviation between a traveling path between the two consecutive probe points of the new trajectory and a line between two nodes of a road link of the road network to which the two consecutive probe points are matched; and
designating the transition between the two consecutive probe points as invalid based on a comparison of the deviation to a threshold value.

8. The method of claim 2, wherein the feasibility check comprises:
for three consecutive probe points of the new trajectory, wherein the three consecutive probe points include the two consecutive probe points of the new trajectory, determining that two traveling paths of the three consecutive probe points share an intersection node of the road network;
determining a distance between a snapped point of a second road of the intersection node; and
designating a transition among the three consecutive probe points as invalid based on comparison of the distance to a threshold value.

9. The method of claim 1, wherein the wrong map feature includes a direction of travel, a road geometry, or a combination thereof.

10. A non-transitory computer-readable storage medium carrying one or more sequences of one or more instructions which, when executed by one or more processors, cause an apparatus to at least perform the following steps:
segmenting, by a computer-implemented map matcher, a probe trajectory into one or more low-speed probe segments and into one or more high-speed probe segments, wherein the one or more low-speed probe segments include one or more first sub-sets of a plurality of probe points of the probe trajectory that are traveling below a speed threshold, wherein the one or more high-speed probe points include one or more second sub-sets of the plurality of probe points of the probe trajectory that are traveling above the speed threshold, and wherein the computer-implemented map matcher uses a map matching technology to match the plurality of probe points of the probe trajectory to a road network stored in digital map data of a geographic database;
splitting, by the computer-implemented map matcher, the one or more low-speed probe segments at a detected turning point;
creating, by the computer-implemented map matcher, a new probe trajectory based on the one or more high-speed probe segments and the detected turning point of each segment of the one or more low-speed segments; and
performing, by the computer-implemented map matcher, a feasibility check between two consecutive probe points of the new trajectory to detect a wrong map feature in map data against which the new trajectory is map matched,
wherein the feasibility check verifies a validity of a transition between the two consecutive probe points with respect to the road network stored in the digital map data of the geographic database.

11. The non-transitory computer-readable storage medium of claim 10, wherein the apparatus is further caused to:
generate new map data, updated map data, or a combination thereof based on the detected wrong map feature, a map matching of the new trajectory, or a combination thereof.

12. The non-transitory computer-readable storage medium of claim 10, wherein the apparatus is further caused to:
generate navigation guidance information based on the detected wrong map feature, a map matching of the new trajectory, or a combination thereof.

13. The non-transitory computer-readable storage medium of claim 10, wherein the apparatus is further caused to:
determine parking accessor data based on the detected wrong map feature, a map matching of the new trajectory, or a combination thereof,
wherein the parking accessor data comprises one or more locations or one or more road segments that are used to access or leave at least one parking location.

14. The non-transitory computer-readable storage medium of claim 10, wherein the apparatus is further caused to:
provide an autonomous driving mode, a highly assisted driving mode, or a combination thereof based on the detected wrong map feature, a map matching of the new trajectory, or a combination thereof.

* * * * *